US011880863B2

United States Patent
Li et al.

(10) Patent No.: US 11,880,863 B2
(45) Date of Patent: Jan. 23, 2024

(54) SHELF INTERACTION METHODS AND SHELVES

(71) Applicant: BOE Technology Group Co., Ltd., Beijing (CN)

(72) Inventors: Hui Li, Beijing (CN); Tong Liu, Beijing (CN); Hao Fang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 41 days.

(21) Appl. No.: 17/554,878

(22) Filed: Dec. 17, 2021

(65) Prior Publication Data

US 2022/0114617 A1 Apr. 14, 2022

Related U.S. Application Data

(63) Continuation of application No. PCT/CN2021/081316, filed on Mar. 17, 2021.

(30) Foreign Application Priority Data

Mar. 20, 2020 (CN) .......................... 202010202825.7

(51) Int. Cl.
G06Q 30/00 (2023.01)
G06Q 30/0251 (2023.01)
G06Q 10/087 (2023.01)

(52) U.S. Cl.
CPC ....... G06Q 30/0251 (2013.01); G06Q 10/087 (2013.01)

(58) Field of Classification Search
CPC .......................... G06Q 30/0251; G06Q 10/087
See application file for complete search history.

(56) References Cited

U.S. PATENT DOCUMENTS 10,121,164 B2    11/2018   Aoki et al.
2014/0006229 A1*  1/2014   Birch .................. G06Q 10/087
                                                           705/28

(Continued)

FOREIGN PATENT DOCUMENTS

CN          108171286 A       6/2018
CN          109086971 A      12/2018

(Continued)

OTHER PUBLICATIONS

Winick, E., Walmart is unleashing shelf-scanning robots to peruse its aisles, Oct. 26, 2017, Cambridge: Technology Review, Inc. (Year: 2017).*

(Continued)

*Primary Examiner* — Matthew L Hamilton
(74) *Attorney, Agent, or Firm* — IPro, PLLC

(57) ABSTRACT

The present application relates to a shelf interaction method and a shelf. The shelf is provided with at least one image capturing device. The method includes: capturing an image of the shelf through the at least one image capturing device; in response to detecting that a first position on the shelf is changed from presence of a first item of goods to absence of the first item of goods according to the image, identifying a first category of the taken-away first item of goods; in response to that a second goods category associated with the first position is the same as or different from the first category of the taken-away first item of goods, sending first prompt information to indicate that the first item of goods is taken away.

11 Claims, 11 Drawing Sheets

(56) References Cited

U.S. PATENT DOCUMENTS

| | | | |
|---|---|---|---|
| 2015/0235157 A1* | 8/2015 | Avegliano | G06Q 10/087 |
| | | | 705/7.25 |
| 2017/0124603 A1* | 5/2017 | Olson | H04L 67/52 |
| 2017/0142373 A1* | 5/2017 | Black | H04W 64/00 |
| 2017/0178060 A1* | 6/2017 | Schwartz | G06Q 10/087 |
| 2018/0276596 A1* | 9/2018 | Murthy | G06Q 10/087 |
| 2019/0156277 A1* | 5/2019 | Fisher | G06N 3/08 |
| 2019/0197561 A1* | 6/2019 | Adato | G06T 7/73 |
| 2019/0215424 A1* | 7/2019 | Adato | G06T 7/521 |
| 2019/0236530 A1* | 8/2019 | Cantrell | G06V 40/23 |
| 2019/0236531 A1* | 8/2019 | Adato | H04N 23/54 |
| 2020/0005225 A1* | 1/2020 | Chaubard | H04N 23/57 |
| 2020/0202163 A1* | 6/2020 | Feng | G06Q 30/02 |
| 2021/0097478 A1* | 4/2021 | Yang | G06V 20/20 |
| 2022/0051177 A1* | 2/2022 | Savvides | G06V 10/82 |
| 2022/0114617 A1 | 4/2022 | Li et al. | |
| 2023/0076979 A1* | 3/2023 | Krishnamurthy | G06V 10/751 |
| 2023/0112215 A1* | 4/2023 | Yanagi | G06T 7/62 |
| | | | 382/141 |

FOREIGN PATENT DOCUMENTS

| | | |
|---|---|---|
| CN | 109409218 A | 3/2019 |
| CN | 109934633 A | 6/2019 |
| CN | 111428621 A | 7/2020 |

OTHER PUBLICATIONS

PCT/CN2021/081316 international search report.
PCT/CN2021/081316 written opinion.

\* cited by examiner

SHELF INTERACTION METHODS AND SHELVES

CROSS-REFERENCE TO RELATED APPLICATIONS

This application is a continuation application of international PCT Application No. PCT/CN2021/081316, filed on Mar. 17, 2021, which claims priority to Chinese patent application No. 202010202825.7 entitled "SHELF INTERACTION METHODS AND APPARATUSES, AND SHELVES", filed with the Chinese Patent Office on Mar. 20, 2020, the entire contents of which are incorporated herein by reference.

TECHNICAL FIELD

The present application relates to the field of retail technologies, and in particular, to shelf interaction methods and shelves.

BACKGROUND

"New retail" is now more manifested in developing diversified consumption scenario integration between e-commerce platforms and offline physical retailing formats, and creating synergy between a variety of emerging technologies and entire supply chain. Such integration and synergy will help to datalize consumption scenarios, so that data can be used to drive iterative optimization of entire retailing formats, bringing possibilities for development of C2B (Consumer to Business), ODM (Original Design Manufacturer) and other modes.

In the related art, shelves are used only as carriers for goods, and other functions are not integrated therein, which makes it difficult to adapt to needs of "new retail".

SUMMARY

The present application provides shelf interaction methods, shelf interaction apparatuses, and shelves to solve the deficiencies existing in the related art.

According to a first aspect of embodiments of the present application, a shelf interaction method is provided. The method is applied to a shelf. The shelf is provided with at least one image capturing device. The method includes:
  capturing an image of the shelf through the at least one image capturing device;
  in response to detecting that a first position on the shelf is changed from presence of a first item of goods to absence of the first item of goods according to the image, identifying a first category of the taken-away first item of goods;
  in response to that a second goods category associated with the first position is the same as or different from the first category of the taken-away first item of goods, sending first prompt information to indicate that the first item of goods is taken away.

According to a second aspect of the embodiments of the present application, a shelf is provided, including:
  at least one image capturing device;
  a shelf body provided with the at least one image capturing device; and
  a processor connected to the at least one image capturing device and configured to perform steps in the method according to any one of the embodiments described below.

According to a third aspect of the embodiments of the present application, a computer storage medium is further provided. The computer storage medium has computer program instructions stored therein. When the instructions are running on a computer, the computer is caused to execute the method according to any one of the embodiments described below.

The present application has at least the following beneficial effects: by sending first prompt information to indicate that an item of goods is taken away, a manager of a shelf can learn in time that the item of goods is taken away. Since the manager may manage multiple shelves at a same time and may be in another position when receiving the first prompt information, by sending the first prompt information, the manager of the shelf can come to the shelf in time to introduce the item of goods to a customer, thereby increasing a transaction rate of goods.

Based on this, the shelf is enabled to conduct an effective interaction with the customer and the manager of the shelf, which can not only increase the transaction rate of goods on the shelf, but also improve customer consumption experience.

It should be understood that the above general description and the following detailed description are only exemplary and explanatory and are not intended to limit the present disclosure.

BRIEF DESCRIPTION OF THE DRAWINGS

The accompanying drawings, which are incorporated in and constitute a part of this specification, illustrate embodiments consistent with the present application and, together with the specification, serve to explain the principles of this application.

DETAILED DESCRIPTION OF THE EMBODIMENTS

Figure 1:
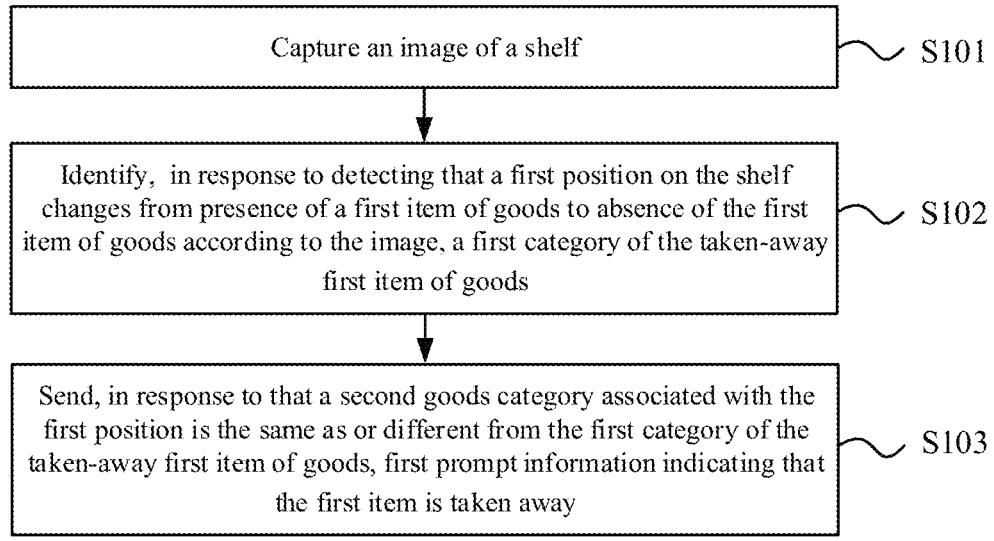
FIG. 1 is a schematic flowchart illustrating a shelf interaction method according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

FIG. 1 is a schematic flowchart illustrating a shelf interaction method according to an embodiment of the present disclosure. The shelf interaction method shown in this embodiment can be applied to a shelf. The shelf may be a display shelf That is, various goods such as cosmetics, wine, and jewelry can be placed on the shelf, but these goods are generally not used for direct sales. A customer can take away an item of the goods from the shelf for view. When interested in and desiring to purchase some items of the goods, the customer may need to contact a manager of the shelf. The manager then fetches a corresponding item of the goods from a warehouse and provides it to the customers. The item of goods taken away from the shelf will be placed back on the shelf.

In addition, the shelf can be provided with at least one image capturing device. The image capturing device can capture images of the goods on the shelf, and can also capture images of a customer near the shelf.

As shown in FIG. 1, the method includes step S101 to step S103.

At step S101, an image of the shelf is captured.

At step S102, in response to detecting that a first position on the shelf is changed from presence of a first item of goods to absence of the first item of goods according to the image, a first category of the taken-away first item of goods is identified.

At step S103, in response to that a second goods category associated with the first position is the same as or different from the first category of the taken-away first item of goods, first prompt information indicating that the first item of goods is taken away is sent.

In an embodiment, the image of the shelf can be captured by an image capturing device, and whether an item of the goods on the shelf is in motion, that is, whether it is moved, can be detected according to the captured image. Methods for detecting whether an item of the goods is in motion include, but are not limited to, a difference method and an Adaboost detection method (the full name of which is adaptive boosting detection method).

The difference method is a method based on a static background model. The difference method specifically includes a continuous image frames difference method, a background subtraction method, and a mixed Gaussian background model method. The Adaboost detection method is a strong classification method obtained by cascading weak classifications based on prior knowledge.

In an embodiment, a method for detecting whether an item of the goods is in motion in the present disclosure can adopt, for example, the continuous image frames difference method. Specifically, with regard to captured multiple continuous image frames, a video can be formed and the difference method applied to continuous images in an image sequence of the video is to detect differences between pixel values at corresponding pixel positions in adjacent images, thereby detecting a moving target. That is because, a pixel value of a position involving the moving target changes, and pixel values in a background area not involving the target remain unchanged or change slightly. If, in two adjacent image frames, a pixel value at a position (x, y) in a $(k-1)^{th}$ image frame is $f_{k-1}(x, y)$, and a pixel value at the same position in a $k^{th}$ image frame is $f_k(x, y)$, an absolute value of a difference between the pixel values at the position (x, y) in the adjacent image frames is:

$$\Delta f_k(x,y)=|f_k(x,y)-f_{k-1}(x,y)|.$$

Therefore, a pixel position for which an absolute value of pixel value difference is greater than a threshold value belongs to pixels of goods in motion, and a pixel position for which an absolute value of pixel value difference is less than the threshold value belongs to pixels of a background not in motion. Based on this, an item of the goods that is in motion in an image can be identified.

Identifying a category of each item of the goods can be implemented based on a Convolutional Neural Network (CNN). The Convolutional Neural Network can be ShuffleNet, ResNet, etc. These types of Convolutional Neural Network belong to lightweight deep learning networks, need a relatively small amount of computation, and are convenient to be applied to equipment like shelves having relatively limited computing resources so as to achieve the best model accuracy through the limited computing resources.

In an embodiment, initial positions for placing goods on a shelf are fixed, and each position for placing goods is associated with one goods category. For example, a lipstick with color number A is placed at position a, and a lipstick with color number B is placed at position b. Therefore, a goods category associated with position a is the lipstick with color number A, and a goods category associated with position b is the lipstick with color number B.

With regard to goods on a shelf, an image capturing device can capture images of the goods to detect whether an item of the goods is in motion. For example, with regard to a first position on the shelf, which can be any position on the shelf, a motion detecting result of an item of goods at the first position can include the following situations:

First, the first position is changed from presence of a first item of goods to absence of the first item goods, and a second goods category associated with the first position is the same as a first category of the taken-away first item of goods, indicating that an item of goods placed at the first position is of a correct goods category, and the item of goods has been taken away.

Second, the first position is changed from presence of the first item of goods to absence of the first item of goods, and the second goods category associated with the first position is different from the first category of the taken-away first item of goods, indicating that an item of goods placed at the first position is of a wrong goods category, and the item of goods has been taken away.

Third, the first position is changed from absence of the first item of goods to presence of the first item of goods, and the second goods category associated with the first position is the same as the first category of the first item of goods that is taken away and then placed back, indicating that the first item of goods is placed back to the first position which is a correct position for placing the first item of goods.

Fourth, the first position is changed from absence of the first item of goods to presence of the first item of goods, and the second goods category associated with the first position is different from the first category of the first item of goods that is taken away and then placed back, indicating that the first item of goods is placed back to the first position which is not a correct position for placing the first item of goods.

For the first situation, it can be determined that a customer takes away the first item of goods from the first position, and the customer takes away the item of goods from the correct position for placing the item of goods. For example, the first item of goods in motion is taken away from position a and is identified as of a goods category "lipstick with color number A". Since the lipstick with color number A should be placed at position a, it can be determined that the customer takes away the item of goods from the correct position for placing it.

In this way, by sending the first prompt information to indicate that the first item of goods is taken away, so that a manager of the shelf can learn that the first item of goods is taken away in time. Since the manager may manage multiple shelves at the same time and he/she may be in another position when receiving the first prompt information, by sending the first prompt information, the manager of the shelf can come to the shelf in time to introduce the first item of goods to the customer, thereby increasing a transaction rate of goods.

Based on this, the shelf is enabled to conduct an effective interaction with the customer and the manager of the shelf, which can not only increase the transaction rate of goods on the shelf, but also improve customer consumption experience.

In an embodiment, the first prompt information may be sent to a manager terminal of the shelf, which can be a mobile phone, a tablet computer, a wearable device, a personal computer, etc.

Figure 2:
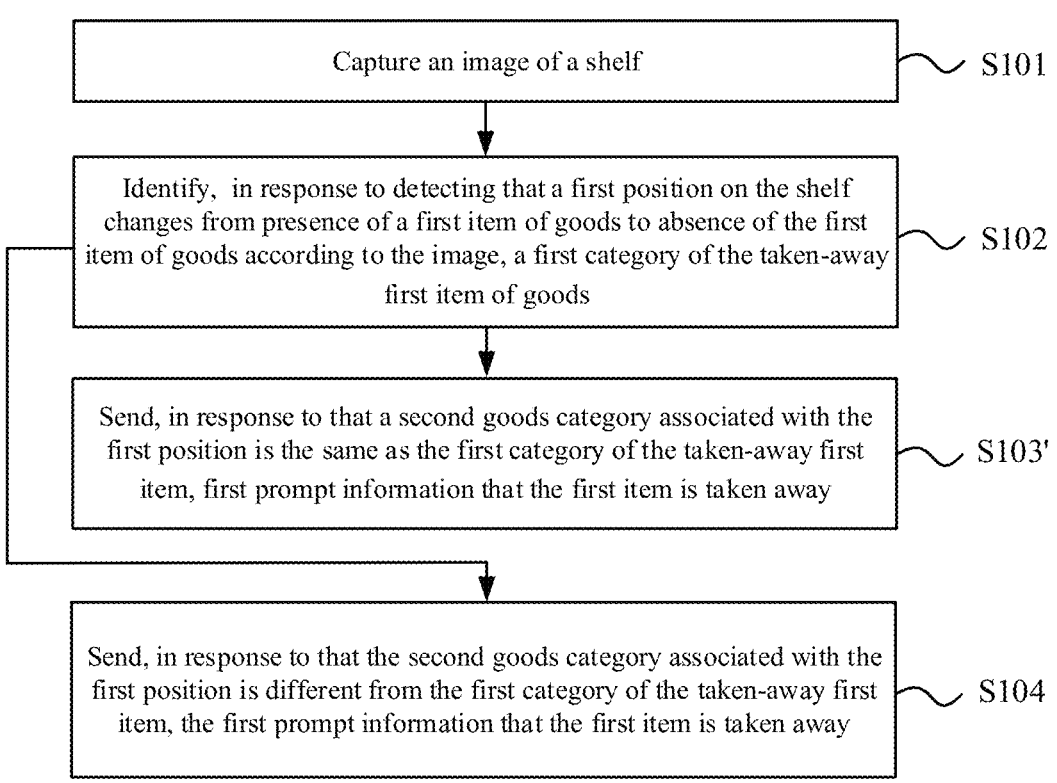
FIG. 2 is a schematic flowchart illustrating a shelf interaction method according to another embodiment of the present disclosure.

FIG. 2 is a schematic flowchart illustrating a shelf interaction method according to another embodiment of the present disclosure. As shown in FIG. 2, the step S103 in the method may include step S103' and step S104.

At step S103', if the second goods category associated with the first position is the same as the first category of the taken-away first item of goods, the first prompt information indicating that the first item of goods is taken away is sent. At step S104, if the second goods category associated with the first position is different from the first category of the taken-away first item of goods, the first prompt information indicating that the first item of goods is taken away is sent.

In an embodiment, as an item of goods may be misplaced, for example, the lipstick with color number A is placed at position b and the lipstick with color number B is placed at position a, when a customer takes away the lipstick with color number A from position b, it may be found that a goods category associated with position b is the lipstick with color number B while a category of the item of goods in motion is identified as the lipstick with color number A. The category of the lipstick with color number A is different from that of the lipstick with color number B. In this case, the first prompt information for indicating that an item of goods, i.e., the lipstick with color number A, is taken away can be sent.

Figure 3:
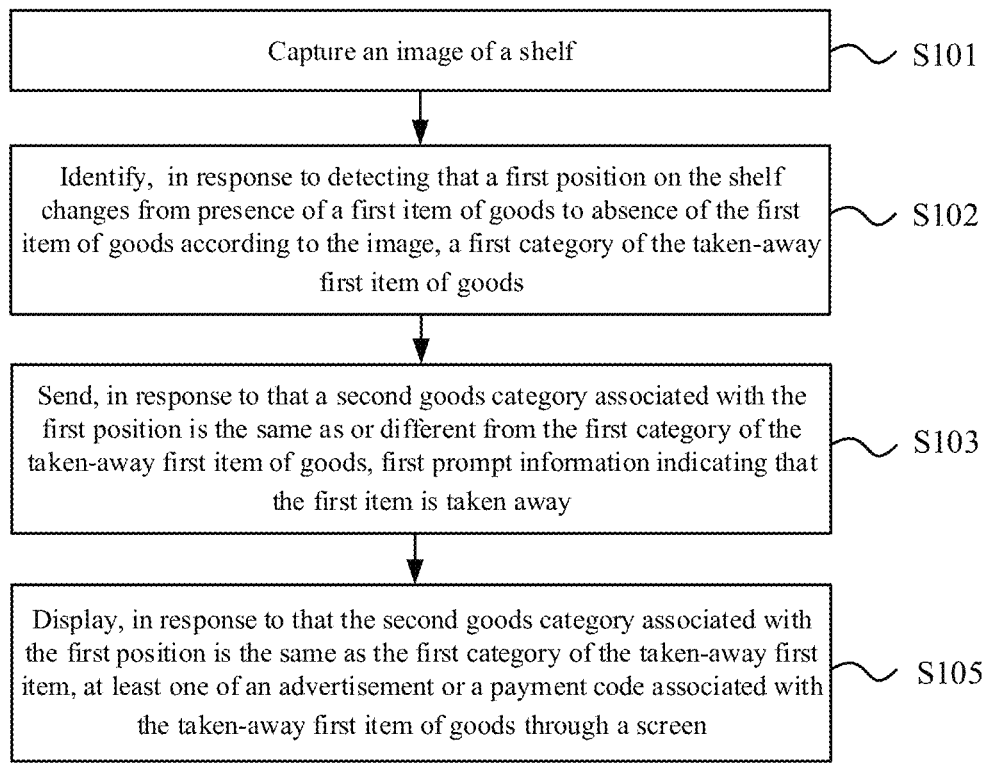
FIG. 3 is a schematic flowchart illustrating a shelf interaction method according to yet another embodiment of the present disclosure.

FIG. 3 is a schematic flowchart illustrating a shelf interaction method according to yet another embodiment of the present disclosure. As shown in FIG. 3, the shelf is further provided with a screen, and the method further includes step S105.

At step S105, if the second goods category associated with the first position is the same as the first category of the taken-away first item of goods, at least one of an advertisement and a payment code associated with the taken-away first item of goods is displayed through the screen.

In an embodiment, the screen can be a liquid crystal display screen or an organic light-emitting diode display screen.

By displaying an advertisement and/or a payment code associated with goods through a screen, customers can learn relevant information, such as composition and usage effects, of the item of goods in time according to the advertisement, thereby improving customer consumption experience, and can scan the payment code for an express checkout.

Figure 4:
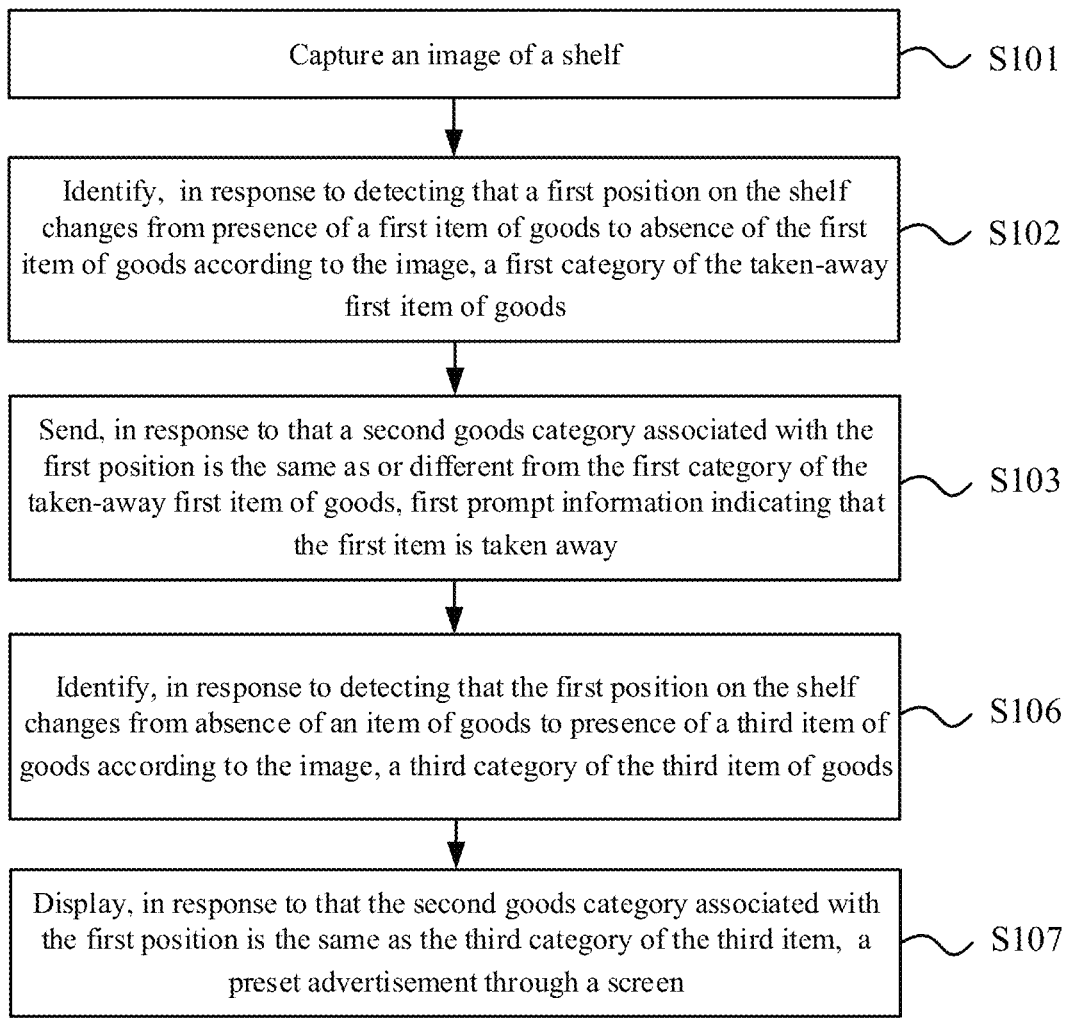
FIG. 4 is a schematic flowchart illustrating a shelf interaction method according to yet another embodiment of the present disclosure.

FIG. 4 is a schematic flowchart illustrating a shelf interaction method according to yet another embodiment of the present disclosure. As shown in FIG. 4, the method further includes step S106 to step S107.

At step S106, in response to detecting that the first position on the shelf is changed from absence of an item of goods to presence of a third item of goods according to the image, a third category of the placed-back third item of goods is identified.

At step S107, in response to that the second goods category associated with the first position is the same as the third category of the placed-back third item of goods, a preset advertisement is displayed through the screen.

In an embodiment, the preset advertisement can be an advertisement related or not related to the goods, and can be specifically set according to actual needs.

In an embodiment, in response to detecting that the first position on the shelf is changed from absence of an item of goods to presence of the third item of goods according to the image, it indicates that the third item of goods is placed back to the first position on the shelf. In this case, after the taken-away third item of goods is placed back on the shelf, it can be determined whether the second goods category associated with the first position is the same as the third category of the placed-back third item of goods. If the second goods category associated with the first position is the same as the third category of the placed-back third item of goods, it indicates that the customer has placed the third item of goods at a correct position. The screen can be changed from displaying an advertisement related to the third item of goods to displaying the preset advertisement.

Figure 5:
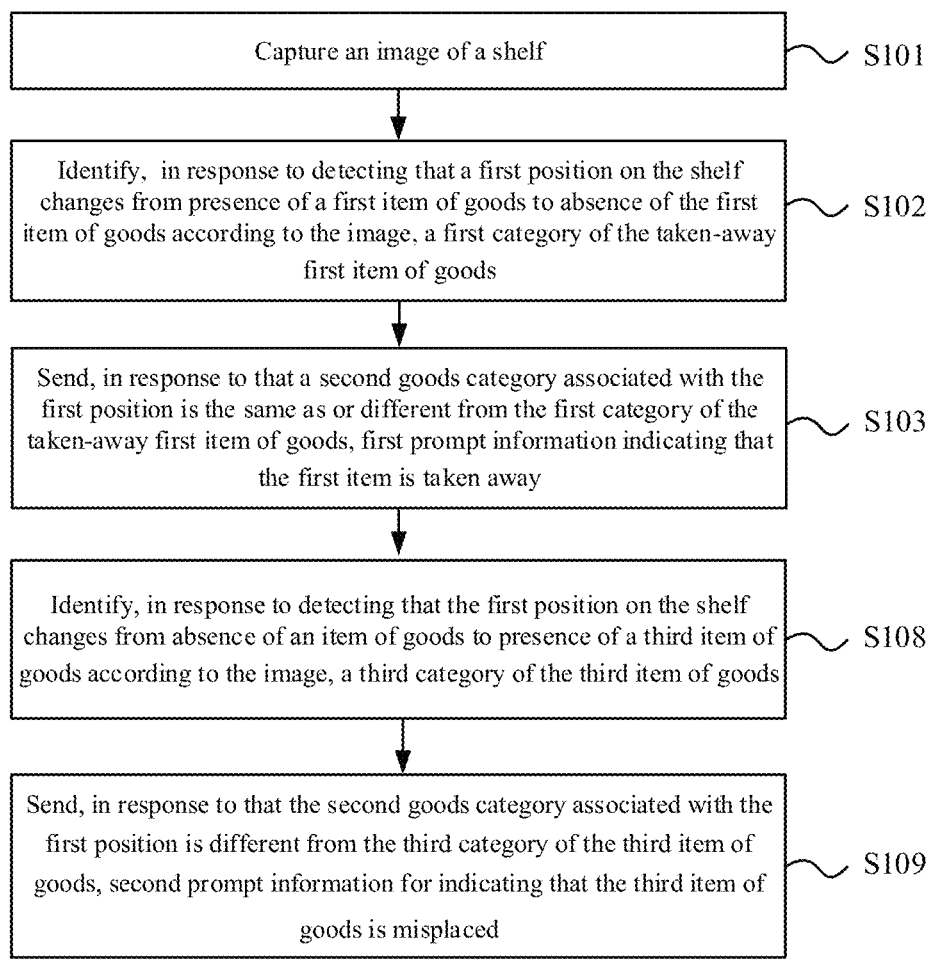
FIG. 5 is a schematic flowchart illustrating a shelf interaction method according to yet another embodiment of the present disclosure.

FIG. 5 is a schematic flowchart illustrating a shelf interaction method according to yet another embodiment of the present disclosure. As shown in FIG. 5, the method further includes step S108 to step S109.

Step S108, in response to detecting that the first position on the shelf is changed from absence of an item of goods to presence of the third item of goods according to the image, the third category of the placed-back third item of goods is identified.

Step S109, in response to that the second goods category associated with the first position is different from the third category of the placed-back third item of goods, second prompt information for indicating that the placed-back third item of goods is misplaced is sent.

In an embodiment, in response to detecting that the first position on the shelf is changed from absence of an item of goods to presence of the third item of goods according to the image, it indicates that the third item of goods is placed back to the first position on the shelf. In this case, after the third item of goods is placed back on the shelf, it can be determined whether the second goods category associated with the first position is the same as the third category of the placed-back third item of goods. If the second goods category associated with the first position is different from the third category of the placed-back third item of goods, it indicates that the customer has placed the third item of goods at a wrong position, and the second prompt information for indicating that the third item of goods is misplaced can be sent. For example, the second prompt information is sent to a manager terminal of the smart shelf, so that a manager can come to the shelf in time and places the third item of goods back to a correct position.

Figure 6:
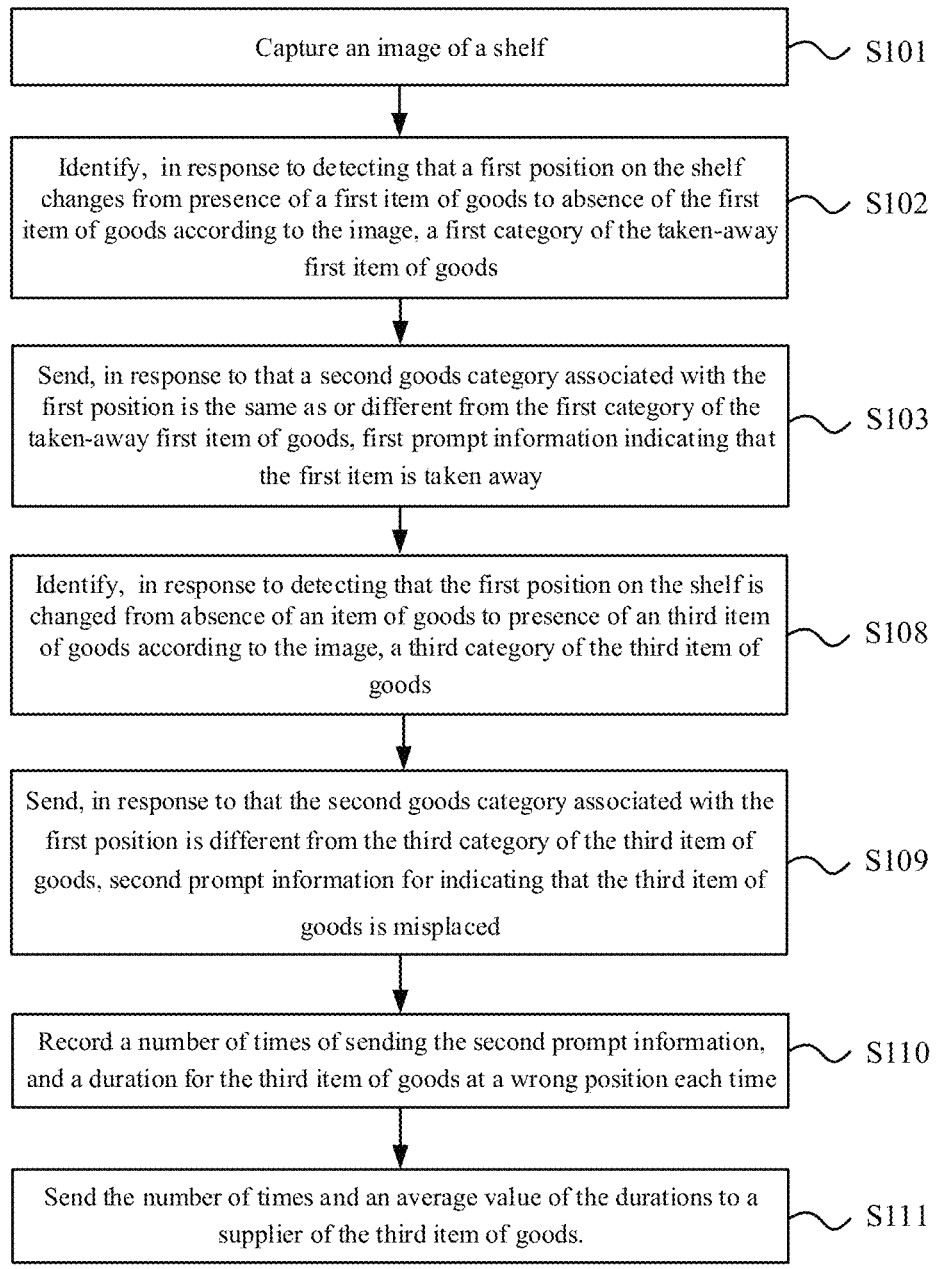
FIG. 6 is a schematic flowchart illustrating a shelf interaction method according to yet another embodiment of the present disclosure.

FIG. 6 is a schematic flowchart illustrating a shelf interaction method according to yet another embodiment of the present disclosure. As shown in FIG. 6, the method further includes step S110 to step S111.

Step S110, a number of times of sending the second prompt information, and a duration for the third item of goods at a wrong position each time are recorded.

Step S111, the number of times and an average value of the durations are sent to a supplier of the third item of goods.

In an embodiment, the number of times of sending the second prompt information, and the duration for the third item of goods at a wrong position each time can be recorded, and then the number of times and the average value of the durations are sent to the supplier of the third item of goods.

As when the third item of goods is misplaced, the second prompt information can be sent to the manager terminal, if the average value of the durations for the third item of goods at a wrong position is relatively long, it indicates that the manager does not place the third item of goods back to the correct position as soon as possible, and based on this, it can be learned whether the manager does his/her duty. In addition, according to the number of times of sending the second prompt information, it can be known whether some item of goods has been misplaced too many times. Therefore, defects of the item of goods can be studied so as to reduce the number of times that the item of goods is misplaced.

Of course, in addition to recording the number of times of sending the second prompt information and the duration for the third item of goods at a wrong position each time, the third category of the third item of goods that is misplaced can be further recorded.

Figure 7:
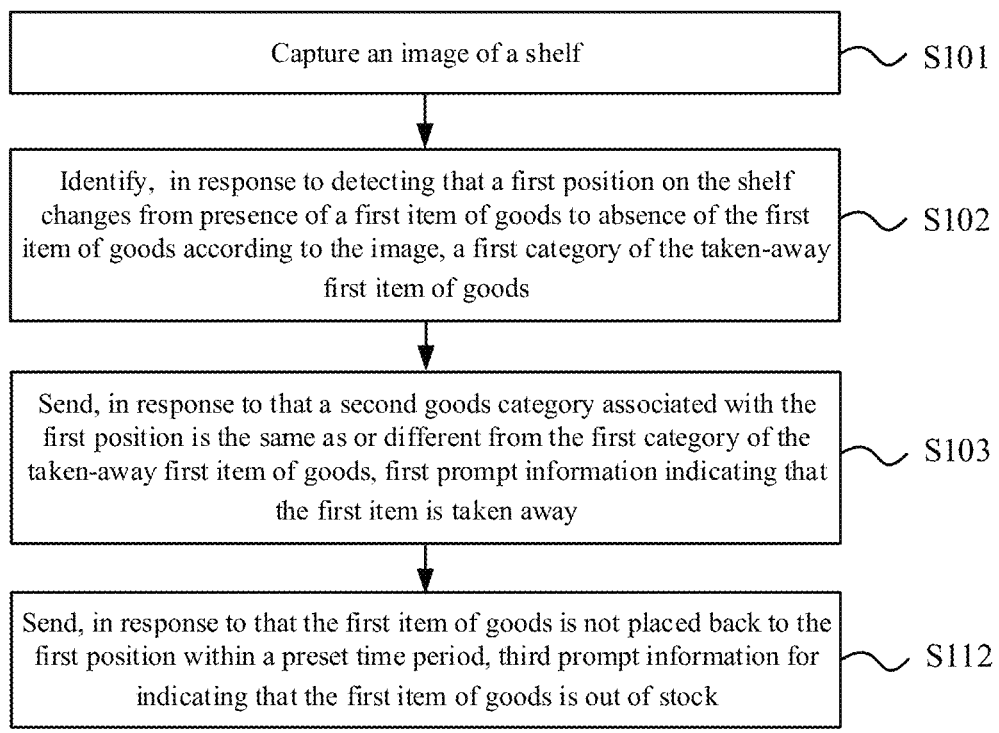
FIG. 7 is a schematic flowchart illustrating a shelf interaction method according to yet another embodiment of the present disclosure.

FIG. 7 is a schematic flowchart illustrating a shelf interaction method according to yet another embodiment of the present disclosure. As shown in FIG. 7, the method further includes step S112.

At step S112, if the first item of goods is not placed back to the first position within a preset time period, third prompt information for indicating that the first item of goods is out of stock is sent.

In an embodiment, although the shelf is used as a display shelf and goods placed thereon are generally not directly sold, when an item of the goods is out of stock in the warehouse, the item of goods on the shelf can be sold. In this case, after an item of the goods is taken away from a position, this position is not placed with such item of goods until an arrival of a new item of goods. That is, such item of goods is not placed back to or at this position for a relatively long time. For example, the item of goods has not been placed back to the position for a preset time period. In this case, by sending the third prompt information to indicate that an item of the goods is out of stock to the manager terminal of the shelf, a manager can replenish the item of goods as soon as possible.

Figure 8:
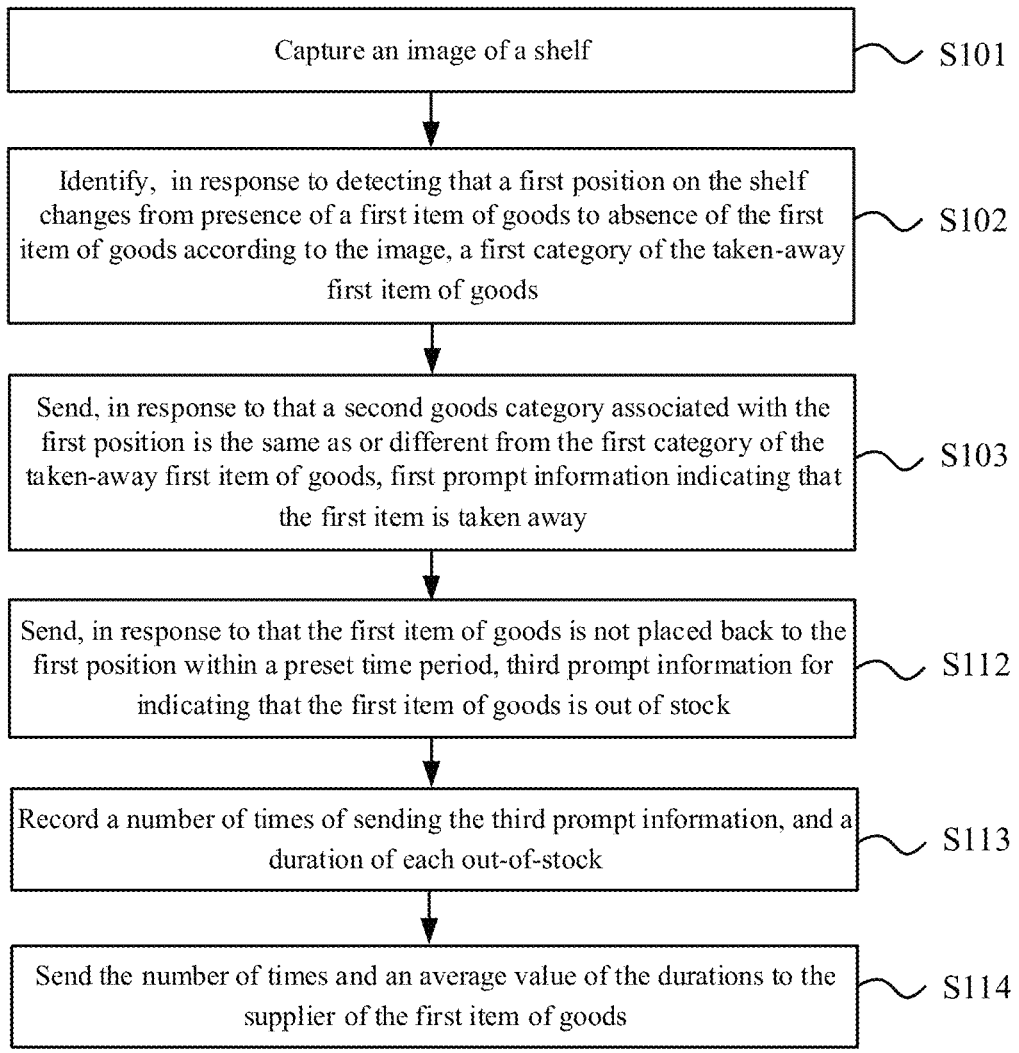
FIG. 8 is a schematic flowchart illustrating a shelf interaction method according to yet another embodiment of the present disclosure.

FIG. 8 is a schematic flowchart illustrating a shelf interaction method according to yet another embodiment of the present disclosure. As shown in FIG. 8, the method further includes step S113 to step S114.

At step S113, a number of times of sending the third prompt information, and a duration of each out-of-stock are recorded.

At step S114, the number of times and an average value of the durations are sent to the supplier of the first item of goods.

In an embodiment, the number of times of sending the third prompt information and the duration of each out-of-stock can be recorded, and the number of times and the average value of the durations are sent to the supplier of the first item of goods.

As when an item of goods is out of stock, the third prompt information can be sent to the manager terminal, if the item of goods is out of stock for a relatively long time, it indicates that the manager has not replenished the item of goods as soon as possible, and based on this, it can be learned whether the manager does his/her duty. In addition, according to the number of times of sending the third prompt information, it can be known that some item of goods is out of stock many times, so as to increase the production of such item of goods and ensure the stable supply of the item of goods.

Of course, in addition to recording the number of times of sending the third prompt information and the duration of each out-of-stock, the category of the item of goods that is out of stock can be further recorded.

Figure 9:
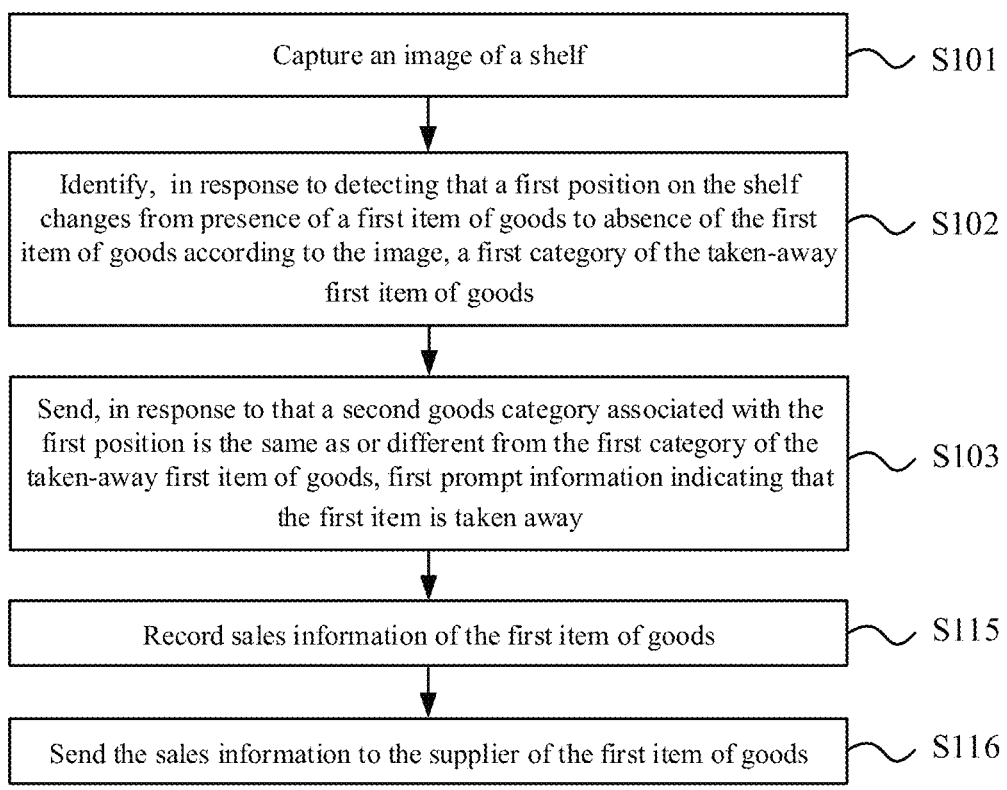
FIG. 9 is a schematic flowchart illustrating a shelf interaction method according to yet another embodiment of the present disclosure.

FIG. 9 is a schematic flowchart illustrating a shelf interaction method according to yet another embodiment of the present disclosure. As shown in FIG. 9, the method further includes step S115 to step S116.

At step S115, sales information of the first item of goods is recorded.

At step S116, the sales information is sent to the supplier of the first item of goods.

In an embodiment, a customer can complete payment for an purchased item of goods by scanning a payment code such as a QR code displayed on the screen, and the shelf can record sales information of the item of goods and send the sales information of the item of goods to a supplier of the item of goods, so that the supplier can update accounts of the item of goods.

The sales information includes, but is not limited to, a purchase price, a purchase conversion rate (a ratio of a number of purchases to a number of being taken-away times), etc.

Figure 10:
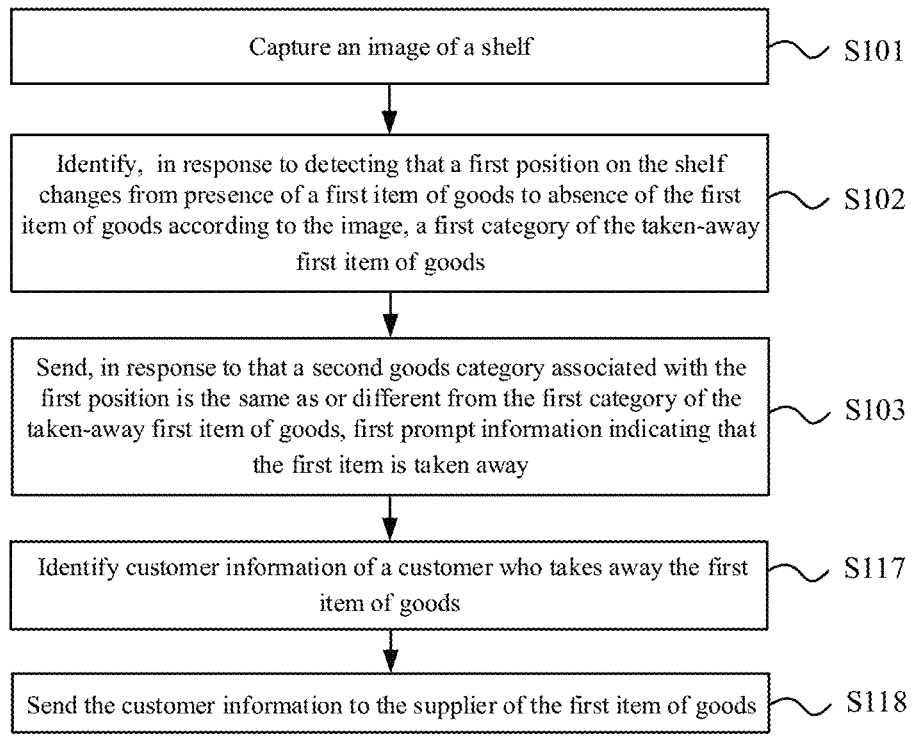
FIG. 10 is a schematic flowchart illustrating a shelf interaction method according to yet another embodiment of the present disclosure.

FIG. 10 is a schematic flowchart illustrating a shelf interaction method according to yet another embodiment of the present disclosure. As shown in FIG. 10, the method further includes step S117 to step S118.

At step S117, customer information of a customer who takes away the first item of goods is identified.

At step S118, the customer information is sent to the supplier of the first item of goods.

In an embodiment, the shelf can also identify the customer information of the customer who takes away the first item of goods. For example, an image of the customer can be captured through an image capturing device, and person characteristic identification can be performed on the customer to determine the gender, height, etc. of the customer. For example, other customer information can be determined based on information in a payment software used by the customer to complete payment, an average customer consumption amount can be determined based on a consumption history of the customer, and a geographical distribution of customers who consume each category of goods can be determined based on a position where the shelf is.

By further sending the customer information to the supplier of the first item of goods, the supplier can learn the customer information in time so to make corresponding adjustments on the first item of goods for different customers, and thereby the first item of goods can be adapted to needs of various customers.

Figure 11:
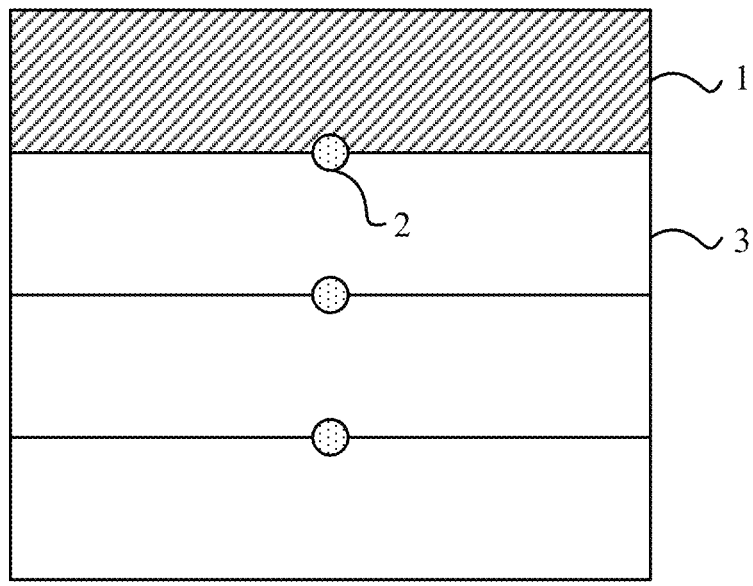
FIG. 11 is a schematic structural diagram illustrating a shelf according to an embodiment of the present disclosure.

FIG. 11 is a schematic structural diagram illustrating a shelf according to an embodiment of the present disclosure. As shown in FIG. 11, the shelf includes:

a screen 1, an image capturing device 2, and a shelf body 3, where the screen 1 and the image capturing device 2 are arranged on the shelf body;

a processor connected to the screen 1 and the image capturing device 2. The processor is configured to perform steps in the method according to any one of the embodiments described above.

In an embodiment, the processor in the shelf can perform the steps in the method according to any one of the embodiments described above. Three states of goods at a certain position can be pre-stored. For example, by taking position a as an example, states that can be pre-stored comprise State 0 indicating that position a is empty (that is, there is no item of goods at position a), State 1 indicating that position a is a place with an item of goods of a correct category (that is, an associated item of goods, such as the lipstick with color number A), and State 2 indicating that position a is placed with an item of goods of a wrong category (that is, an unassociated item of goods, such as an item of goods other than the lipstick with color number A). In this way, when the above-described embodiments are implemented, the steps can be performed by determining a change in the state of position a.

For example, if the state of position a is changed from State 1 to State 0, the first prompt information for indicating that the associated item of goods is taken away can be sent, and an advertisement and/or a payment code associated with the associated item of goods can be displayed through the screen. If a duration of maintaining State 0 reaches a preset time period, the third prompt information for indicating that the associated item of goods is out of stock is sent.

For example, if the state of position a is changed from State 0 to State 1, the screen can be changed from displaying an advertisement related to the associated item of goods to displaying a preset advertisement.

For example, if the state of position a is changed from State 0 to State 2, the second prompt information for indicating that the unassociated item of goods is misplaced can be sent.

For example, if the state of position a is changed from State 2 to State 0, only the first prompt information for indicating that the unassociated item of goods is taken away can be sent to the manager terminal of the shelf.

Figure 12:
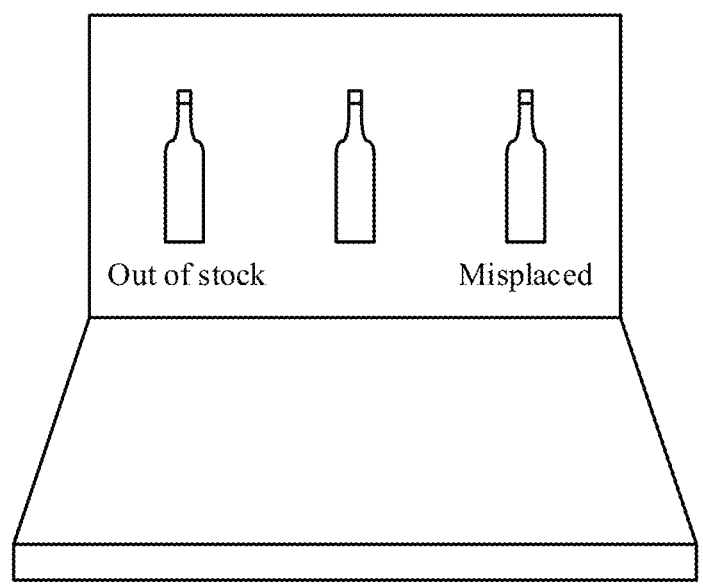
FIG. 12 is a schematic diagram illustrating a manager terminal according to an embodiment of the present disclosure.

FIG. 12 is a schematic diagram illustrating a manager terminal according to an embodiment of the present disclosure. As shown in FIG. 12, taking the manager terminal being a personal computer as an example, the shelf can send the second prompt information and the third prompt information to the manager terminal, and the terminal can display a specific position at which an item of goods is out of stock or in a misplaced state. As shown in FIG. 12, a manager can accurately determine that the item of goods on the left is out of stock and the item of goods on the right is misplaced based on a display result of the terminal.

Figure 13:
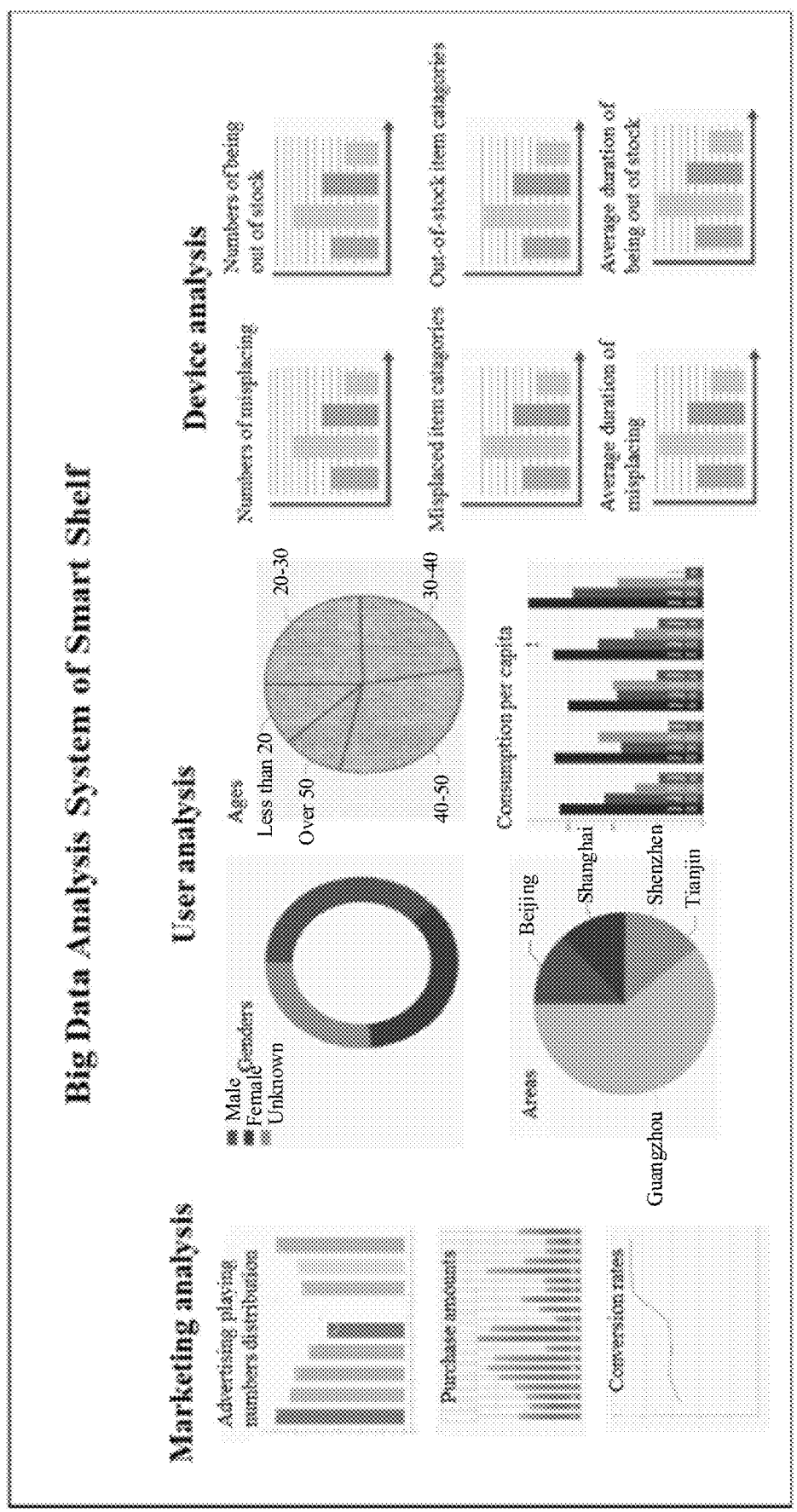
FIG. 13 is a schematic diagram illustrating information received by a supplier according to an embodiment of the present disclosure.

FIG. 13 is a schematic diagram illustrating information received by a supplier according to an embodiment of the present disclosure. As shown in FIG. 13, a number of times of sending second prompt information, an average value of durations for an item of goods being misplaced, a number of times of sending third prompt information, an average value of durations of each out-of-stock, sales information, customer information, etc. are sent to a supplier of the item of goods, so that these kinds of information can be integrated to be displayed on a device interface of the supplier. Of course, the information sent to the supplier can be canceled or supplemented as required, and is not limited to the above-mentioned contents.

Optionally, the shelf body includes a plurality of shelf layers, for example, three shelf layers as shown in FIG. 11. The image capturing device includes a plurality of image capturing devices, for example, three image capturing devices as shown in FIG. 11. Each of the shelf layers is provided with one of the image capturing devices.

In an embodiment, by providing one image capturing device on each shelf layer, for example, on the top of each shelf layer, it can be accurately determined whether an item of goods on each shelf layer is in motion, and a category of the item of goods can be identified.

Optionally, the screen is arranged on the top of the shelf.

In an embodiment, by arranging the screen on the top of the shelf, it is easier for a customer to view a displayed advertisement, which helps to improve a playing effect of the advertisement.

This application also provides a computer storage medium. The computer storage medium stores computer program instructions. When the instructions are running on a computer, the computer is caused to execute the method according to any one of the embodiments described above.

Regarding the apparatuses in the above-described embodiments, the specific manner for each module performing operations has been described in detail in the embodiments of the related methods, and will not be elaborated here.

For the apparatus embodiments, since they basically correspond to the method embodiments, reference may be made to the part of description relating to the method embodiments. The apparatus embodiments described above are merely illustrative, where the units described as separate components may be or may not be physically separated, and the components displayed as units may be or may not be physical units, i.e., may be located in one place or may be distributed to multiple network units. Some or all of the modules may be selected according to actual needs to achieve the objectives of solutions recited in the present embodiments. Those of ordinary skill in the art can understand and implement the solutions without any creative effort.

In the present application, the terms "first" and "second" are used only for descriptive purposes, and cannot be understood to indicate or imply relative importance. The term "plurality" and "multiple" refers to two or more, unless specifically defined otherwise.

Other embodiments of the present application will be readily apparent to those skilled in the art after considering the specification and practicing the contents disclosed herein. The present application is intended to cover any variations, usage, or adaptations of the present application, which follow the general principle of the present application and involve common knowledge or conventional technical means in the art that are not disclosed in the present application. The specification and embodiments are to be regarded as illustrative only. The true scope and spirit of the present application are pointed out by the following claims.

The invention claimed is:

1. A method comprising:
capturing, by an image capturing device, a first image of a first item of goods at a first position on a shelf;
capturing, by the image capturing device, a second image of the first position on the shelf;
applying, by a processor, a difference method to the first image and the second image based on detecting differences between pixel values at corresponding pixel positions in adjacent images;
in response to applying the difference method, determining, by a processor, a category of a first item of goods and detecting that the first item of goods is removed from the first position on the shelf;
in response to determining the category of the first item of goods, sending, by the processor, to a manager terminal, a first prompt indicating the first item of goods has been removed from the shelf;
capturing, by the image capturing device, a third image at the first position on the shelf;
capturing, by the image capturing device, a fourth image of a second item of goods at the first position on the shelf;
applying, by the processor, a difference method to the third image and the fourth image based on detecting differences between pixel values at corresponding pixel positions in adjacent images;
in response to applying the difference method, determining, by the processor, a category of a second item of goods and detecting that the second item of goods is placed at the first position on the shelf;
in response to determining the category of the second item of goods, sending, by the processor, to the manager terminal, a second prompt indicating the second item of goods is different from a category of goods expected at the first position of the shelf;
recording, by the processor, a number of times of sending the second prompt and durations of the second item of goods whose category is different from the category of goods expected at the first position;
sending, by the processor, to a supplier computer, the number of times of sending the second prompt and an average of the durations of the second item of goods whose category is different from the category of goods expected at the first position to a supplier of the second item of goods.

2. The method according to claim 1, wherein the shelf comprises a screen; and the method further comprises:
in response to that the category of the first item of goods and the category of goods expected at the position are the same, displaying an advertisement or a payment code associated with the first item of goods on the screen.

3. The method according to claim 1, wherein the shelf comprises a screen; and the method further comprises:
in response to that the category of the second item of goods and the category of goods expected at the position are the same, displaying an advertisement on the screen.

4. The method according to claim 1, further comprising:
in response to that the first item of goods is not placed back to the position within a preset time period, sending a third prompt using the processor.

5. The method according to claim 4, further comprising:
recording a number of times of sending the third prompt and durations of the first item of goods not being at the position;
sending the number of times and an average of the durations using the processor, to a supplier of the first item of goods.

6. The method according to claim 1, further comprising:
recording sales information of the first item of goods;
sending the sales information to a supplier of the first item of goods using the processor.

7. The method according to claim 1, further comprising:
identifying customer information of a customer who removes the first item of goods from the position;
sending the customer information to the supplier of the first item of goods using the processor.

8. A shelf, comprising:
at least one image capturing device;
a shelf body provided with the at least one image capturing device; and
a processor configured to:
capture, by the at least one image capturing device, a first image of a first item of goods at a first position on a shelf;
capture, by the at least one image capturing device, a second image of the first position on the shelf;
apply, by a processor, a difference method to the first image and the second image based on detecting differences between pixel values at corresponding pixel positions in adjacent images;
in response to the application of the difference method, determining, by a processor, a category of a first item of goods and detecting that the first item of goods is removed from the first position on the shelf;
in response to the determination of the category of the first item of goods, sending, by the processor, to a manager terminal, a first prompt indicating the first item of goods has been removed from the shelf;
capture, by the at least one image capturing device, a third image at the first position on the shelf;
capture, by the at least one image capturing device, a fourth image of a second item of goods at the first position on the shelf;
apply, by the processor, a difference method to the third image and the fourth image based on detecting differences between pixel values at corresponding pixel positions in adjacent images;
in response to the application of the difference method, determining, by the processor, a category of a second item of goods and detecting that the second item of goods is placed at the first position on the shelf;
in response to the determination of the category of the second item of goods, sending, by the processor, to the manager terminal, a second prompt indicating the second item of goods is different from a category of goods expected at the first position of the shelf;
record a number of times of sending the second prompt and durations of the second item of goods whose category is different from the category of goods expected at the first position;
send to a supplier computer, the number of times of sending the second prompt and an average of the durations of the second item of goods whose category is different from the category of goods expected at the first position to a supplier of the second item of goods.

9. The shelf according to claim 8, further comprising the image capturing device.

10. The shelf according to claim 8, further comprising a screen.

11. A non-transitory computer storage medium having computer program instructions stored therein, the computer program instructions when executed by a processor, implementing a method comprising:

capturing, by an image capturing device, a first image of a first item of goods at a first position on a shelf;

capturing, by the image capturing device, a second image of the first position on the shelf;

applying, by a processor, a difference method to the first image and the second image based on detecting differences between pixel values at corresponding pixel positions in adjacent images;

in response to applying the difference method, determining, by a processor, a category of a first item of goods and detecting that the first item of goods is removed from the first position on the shelf;

in response to determining the category of the first item of goods, sending, by the processor, to a manager terminal, a first prompt indicating the first item of goods has been removed from the shelf;

capturing, by the image capturing device, a third image at the first position on the shelf;

capturing, by the image capturing device, a fourth image of a second item of goods at the first position on the shelf;

applying, by the processor, a difference method to the third image and the fourth image based on detecting differences between pixel values at corresponding pixel positions in adjacent images;

in response to applying the difference method, determining, by the processor, a category of a second item of goods and detecting that the second item of goods is placed at the first position on the shelf;

in response to determining the category of the second item of goods, sending, by the processor, to the manager terminal, a second prompt indicating the second item of goods is different from a category of goods expected at the first position of the shelf;

recording, by the processor, a number of times of sending the second prompt and durations of the second item of goods whose category is different from the category of goods expected at the position;

sending, by the processor, to a supplier computer, the number of times of sending the second prompt and an average of the durations of the second item of goods whose category is different from the category of goods expected at the first position to a supplier of the second item of goods.

\* \* \* \* \*